2,870,790
SINGLE LEVER FAUCET

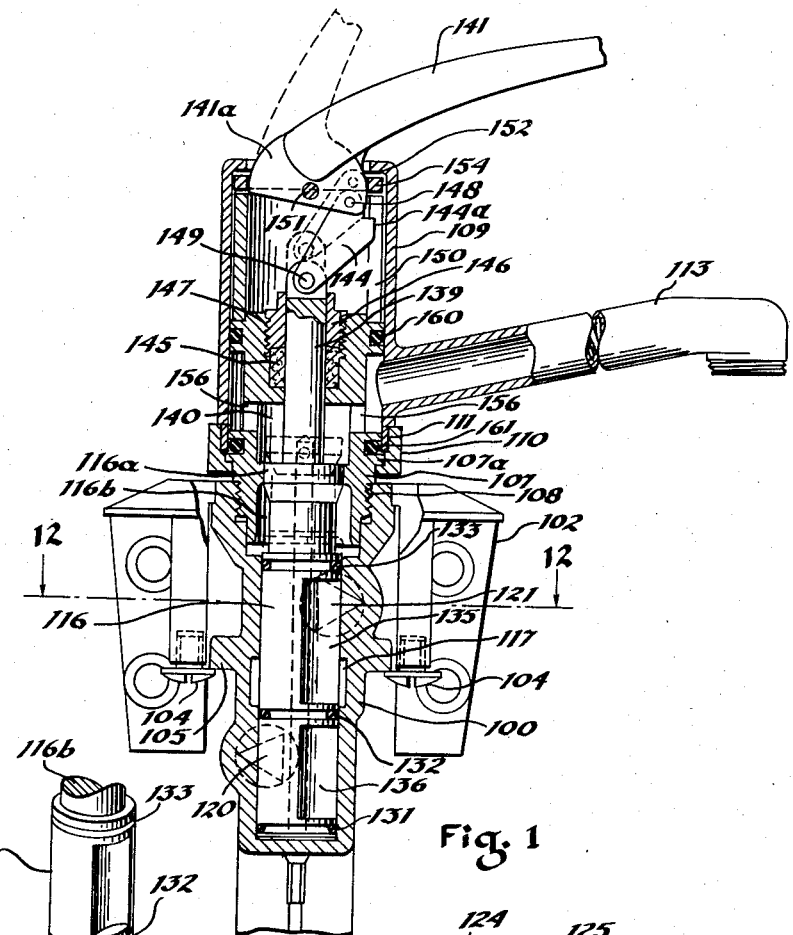

Richard H. Jordan, Mansfield, Ohio, assignor to Barnes Manufacturing Co., Mansfield, Ohio, a corporation of Ohio Application May 14, 1954, Serial No. 429,718

2 Claims. (Cl. 137—625.12)

This invention relates generally to valves and more particularly to single lever mixing valves for mixing a plurality of fluids in any desired proportion.

An object of the present invention is to provide a unitary mixing valve for mixing varied temperatured fluids and regulating the rate of flow and discharge temperature of said fluid through actuation of a single lever arm.

Another object of this invention is to provide a mixing valve, which when not performing a mixing function will not allow any interchange or cross flow of fluid from one valve inlet to another.

A further object of this invention is to provide a single lever mixing valve for fluids in which the proportionate supply of each fluid can be adjusted by moving the lever in one direction and the volume of fluid flow adjusted by moving the same lever in another direction.

A still further object is to provide a single lever mixing valve wherein the proportions of each fluid can be adjusted by one movement of the lever and the volume of said fluid controlled by another movement of the lever, without varying or affecting the proportioning adjustment.

A further object is to provide a valve which is adapted to form a positive seal against fluid overflow or leakage and one that is easy to operate.

Another object of the present invention is to provide a single lever mixing valve characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a vertical sectional view taken through another embodiment of my mixing valve.

Fig. 2 is an enlarged fragmentary vertical sectional view of the valve assembly structure shown in Fig. 1 with the valve sleeve partially removed.

Fig. 3 is an enlarged cross sectional view taken along the plane of line 12—12 of Fig. 1.

Referring now to the drawings, the valve consists mainly of a lower valve body 100 encased in an ornamental bracket or housing 102 and retained therein by screws 104 which engage shoulders 105 of the body 100. The body 100 has a fluid mixing chamber housing 107 threadedly attached thereto at 108, and a cap 109 fastened over said mixing chamber housing by means of a sealing nut 110. The nut 110 threadedly engages cap 109 at 111 and frictionally engages the annular ridge 107a of housing 107. Cap 109 contains a spout 113 and for this reason is rotatably mounted on housing 107; the spout and cap are rotatable through a circle of 360°.

The lower valve body 100 contains a hollow central bore 114 which is machined to receive with close tolerances a valve piston 116. The bore 114 is provided with an enlarged annular groove 117 substantially midway between its end portions. Each of the bore portions above and below the annular groove 117 is provided with a triangular shaped aperture or port in its side walls which form hot and cold water inlet ports 120 and 121 respectively. The body 100 is enlarged at 120a and 121a to receive the fluid supply tubes 124 and 125 respectively, and also to provide chambers 122 and 123 which extend transversely across the entire width of bore 114 to insure an adequate flow of fluid, when desired. It should be noted that inlets 120 and 121 and their associated chambers 122 and 123 are separated axially from one another by annular groove 117 and circumferentially by the narrow wall sections 114a and 114b of bore 114, as best seen in Fig. 3. The inlets and chambers are further seen to extend substantially parallel to one another. The triangular shaped inlet ports are so disposed as to have their base portions extend longitudinally to the axis of bore 114, with their apex pointed transversely away from said axis.

The piston 116 is rotatably and reciprocably received with close tolerances in the bore 114 and consists generally of a solid cylindrical body which normally rests on the bottom or closed end of body 100 in a closed valve position, as seen in Fig. 1. Fig. 1 shows the piston 116 provided with three sealing rings 131, 132 and 133 which are partially recessed into grooves contained in the surface of the piston. The lower seal 131 is positioned very near the lowermost end of said piston. The intermediate seal 132 is located on the piston at a point just below the annular groove 117 when in a valve closing position, as shown in Fig. 1. Upper sealing ring 133 is located at a point just below the uppermost edge of bore 114 when the valve is closed. Intermediate the sealing rings and extending substantially to the edge of each ring are upper and lower pairs of aligned longitudinally extending grooves 135 and 136 respectively. The grooves are seen to extend circumferentially about said piston, approximately 45°, adjacent grooves of each pair being separated from each other by partition 137. The upper and lower pairs of grooves are separated by center or intermediate sealing ring 132 on piston 116.

The diameter of piston 116 decreases slightly at a zone 116b above the uppermost edge of bore 114 providing a space between piston 116 and the interior of chamber housing 107. At a slightly higher zone the piston 116 has an enlarged portion 116a which contacts in sealing engagement the inner walls of mixing chamber housing 107. Above the enlarged portion 116a, piston 116 is provided with an elongated stem 139 which extends upwardly through the interior of mixing chamber 140 and outwardly through an opening in the top of the chamber housing 107. The upper end of the stem is fastened to a handle 141 by means of a connecting link 144. A packing 145 between the stem and the upper outlet in the mixing housing prevents leakage. A packing nut 146 threadedly engages mixing housing 107 at 147 and keeps the packing 145 in place during operation of the valve. The handle 141 has a bifurcated inner end and presents a pair of laterally spaced arms 141a which pivotally and eccentrically engage one end of the link 144 through pin 148. The other end of the link is pivotally connected to stem 139 by means of pin 149. The link 144 has a protruding lug 144a which engages a groove contained in a hollow tubular member 150 which is rotatably supported on the upper surface of mixing chamber housing 107, interiorly and beneath cap 109. The handle 141 is pivotally secured to the side walls near the upper end of the tubular member 150 by means of screws 151. In this manner, the member 150 provides a fulcrum for the pivotal movement of handle 141. An annular corrugated spring 152 is inserted between cap 109 and an annular bearing 154 which rests upon the upper edge of member 150 and causes the handle to return to a near horizontal or valve closing position, upon its release by the operator.

The proportionate amount of fluid flowing from each inlet chamber 122 and 123 is controlled by horizontal rotation of the handle 141 which causes the piston 116 to be rotated so that the longitudinal grooves 135 and 136 are located proximate to the inlet chambers 123 and 122 respectively, in accordance with the desired proportion or combination of fluids desired. In the piston position shown in the cross-sectional view of Fig. 3, fluid could only enter the upper grooves 135 through the chamber 123, since only the upper pair of grooves are in registry with the upper chamber 123; the lower pair of grooves 136 could not possibly register with lower chamber 122 located on the other side of valve body 100 opposite upper chamber 123, since both upper and lower pairs of grooves are in axial alignment on piston 116. As the handle 141 is revolved, the grooves 135 and 136 move either to the right or to the left, so that the lower pair of grooves 136 move into increasing registry with the lower chamber 122 and the upper grooves into decreasing registry with chamber 123 until a position is reached wherein the lower pair of grooves 136 are in full registry with chamber 122 and the upper pair of grooves 135 are completely out of registry with the chamber 123. It can thus be seen that as different temperatured fluids enter through the two chambers, it is possible to produce any desired temperature, by proportioning the amount of each liquid entering the grooves 135 and 136. The flow of the fluid through the grooves is gradually and equally variable since the grooves move into registry with the chamber in a smooth and gradual manner, first one and then the other. When one groove is in full registry with the chamber, the second groove will begin to register as soon as the partition 137 has cleared the edge of wall 114b.

It should be noted at this point that the circumferential extent of grooves 135 and 136 is limited only to the extent that one chamber may be completely shut off while the other is completely exposed to said grooves.

By moving the handle 141 in a vertical plane to the dotted line position of Fig. 1, the piston 116 is caused to move axially up and down. When the piston is in its lowermost position, as illustrated by the solid line position of Fig. 1, no fluid can escape through the lower chamber and grooves. Said chamber and grooves are sealed in by sealing rings 131 and 132. Similarly, no fluid can escape from upper chamber 123 and grooves 135 since they are sealed by rings 132 and 133. It should be noted that no cross-flow can take place between the upper and lower chambers since they are sealed apart by intermediate ring 132. When the piston is raised by means of handle 141, the center ring no longer is in sealing engagement with bore 114 but rather is in a non-sealing position in the enlarged annular groove 117, so that fluid may flow around the ring and upwardly through the upper grooves 135. In the same manner, the upper sealing ring 133 is no longer in sealing engagement with the bore 114, but rather is contained in a free position in the enlarged area above the bore; the same is also true for the enlarged portion 116a of piston 116, as seen in a dotted line position in Fig. 1 with clearance around it in chamber 140. The extent to which the piston may be raised is controlled by the lug 144a of link 144 abutting the lower surface of annular bearing 154. Maximum flow is gained when the center sealing ring maintains a position centrally of the annular groove 117. The uppermost stop position for the handle 141 is reached when the center seal reaches this position. From a closed position, the more handle 141 is raised, the greater quantity of fluid will flow, until it reaches a maximum as described above, whereupon the handle can no longer be raised.

As the fluid enters the grooves 135 and 136, it travels upwardly through the body 100 into the mixing chamber 140, through communicating apertures 156 in housing 107 and outwardly by means of discharge spout 113, which is mounted for rotation on the cap 109. Sealing rings 160 and 161 are provided between the cap 109 and the mixing chamber housing 107 to permit rotation of the cap and spout without leakage.

It can now be seen that the desired temperature may be regulated by horizontal movement of the handle 141 and the rate or volume of flow controlled by a vertical movement of said handle. Thus, I have provided a dual control regulation for faucets, each control independent of the other; through the use of only a single control handle.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of this invention.

What is claimed is:

1. A valve device comprising a body having a generally cylindrical bore, hot and cold water inlet ports communicating with said bore axially spaced therealong and angularly spaced circumferentially around said bore, said body having a mixing chamber downstream from said ports and a discharge outlet communicating with said chamber, a valve piston reciprocable and oscillatable in said bore, upstream and downstream axially aligned valving grooves in said piston and spaced axially along the circumference of said piston, said grooves being positioned to register each one with its respective inlet port while said piston closes the other inlet port, said grooves being movable by piston oscillation across said inlet ports and each partially registering with its respective inlet port for regulating the proportionate flow from each port into said mixing chamber, first uninterrupted sealing means between that portion of said piston between said grooves and a first zone of the surrounding bore when said valve is closed, second uninterrupted sealing means between said piston and a second zone of said bore downstream from said downstream groove, there being a recess of greater diameter in said bore downstream from each of said zones, said sealing means engaging said bore in the respective zones when said valve is closed, and said piston being reciprocable downstream from said closed position to move said sealing means into and out of their respective recesses of greater diameter, the recess downstream of said first uninterrupted sealing means selectively communicating with each of said grooves and the recess downstream of said second uninterrupted sealing means selectively connecting with said upstream groove thereby controlling the fluid flow through both upstream and downstream grooves to said mixing chamber.

2. A valve device as in claim 1 wherein said inlet ports are approximately diametrically opposite each other and each extends arcuately about said bore, each of said upstream and downstream grooves comprises a pair of recesses extending longitudinally of said piston, and each recess subtends an arc of approximately ninety degrees at the circumference of said piston with a narrow rib between each pair of recesses extending the full diameter of said piston, the arcuate extent of each pair of recesses being greater than the arcuate distance around said bore between adjacent edges of said ports.

References Cited in the file of this patent

UNITED STATES PATENTS

| | | |
|---|---|---|
| 1,016,382 | Weeden | Feb. 6, 1912 |
| 1,502,483 | O'Flaherty | July 22, 1924 |
| 1,827,555 | Bolton | Oct. 13, 1931 |
| 1,898,952 | Gray | Feb. 21, 1933 |
| 2,556,780 | Shryock | June 12, 1951 |
| 2,684,691 | Strickler | July 27, 1954 |